United States Patent [19]
Ara et al.

[11] Patent Number: 5,889,597
[45] Date of Patent: *Mar. 30, 1999

[54] IMAGE PROCESSING APPARATUS AND SYSTEM HAVING A DETACHABLE SCANNER UNIT

[75] Inventors: Yoji Ara, Yokohama; Atsushi Noda, Kawasaki, both of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 456,668

[22] Filed: Jun. 1, 1995

[30] Foreign Application Priority Data

| Jun. 1, 1994 | [JP] | Japan | 6-120084 |
| May 23, 1995 | [JP] | Japan | 7-123912 |

[51] Int. Cl.$^6$ .................................................. H04N 1/024
[52] U.S. Cl. ........................... 358/473; 358/296; 358/496
[58] Field of Search ..................................... 358/296, 298, 358/471, 472, 473, 474, 496, 497, 442

[56] References Cited

U.S. PATENT DOCUMENTS

| 4,313,124 | 1/1982 | Hara | 346/140 R |
| 4,345,262 | 8/1982 | Shirato et al. | 346/140 R |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,608,577 | 8/1986 | Hori | 346/140 R |
| 4,723,129 | 2/1988 | Endo et al. | 346/1.1 |
| 4,740,796 | 4/1988 | Endo et al. | 346/1.1 |
| 4,962,430 | 10/1990 | Hiroki et al. | 358/296 |
| 5,172,243 | 12/1992 | Hayashi et al. | 358/473 |
| 5,412,490 | 5/1995 | Kojima et al. | 358/473 |
| 5,475,504 | 12/1995 | Ogura et al. | 358/474 |
| 5,497,245 | 3/1996 | Uchida | 358/406 |
| 5,502,464 | 3/1996 | Takahashi et al. | 346/25 |
| 5,621,544 | 4/1997 | Ogura et al. | 358/496 |

FOREIGN PATENT DOCUMENTS

| 0 232 905 | 8/1987 | European Pat. Off. . |
| 0 485 975 | 5/1992 | European Pat. Off. . |
| 0 548 374 | 6/1993 | European Pat. Off. . |
| 0 551 890 | 7/1993 | European Pat. Off. . |
| 93 05 354 | 7/1993 | Germany . |
| 54-056847 | 5/1979 | Japan . |
| 59-123670 | 7/1984 | Japan . |
| 59-138461 | 8/1984 | Japan . |
| 60-071260 | 4/1985 | Japan . |
| 62-178058 | 8/1987 | Japan . |
| 2-122758 | 5/1990 | Japan . |
| 2 238 758 | 6/1991 | United Kingdom . |

*Primary Examiner*—Peter S. Wong
*Assistant Examiner*—Derek J. Jardieu
*Attorney, Agent, or Firm*—Fitzpatrick, Cella, Harper & Scinto

[57] ABSTRACT

This invention may be used as a system in which a scanner for reading an original document and a recording apparatus are combined, and aims to provide an image information processing apparatus which facilitates the transportation of the system, and an image information processing system. A printer and a scanner can be mounted to each other by accurate positioning when positioning projections provided in the printer are engaged with positioning holes corresponding to the projections on the scanner side, and this mounting is fixed by the engagement of a hook on the scanner side with a recess on the printer side. In this mounted state, a transport passage, including a paper ejection port, for an original document or printing paper is formed, and motive power and electric power are supplied from the printer side to the scanner side via gears. In this state, an image on the original document is read, or an image is recorded on the printing paper.

11 Claims, 7 Drawing Sheets

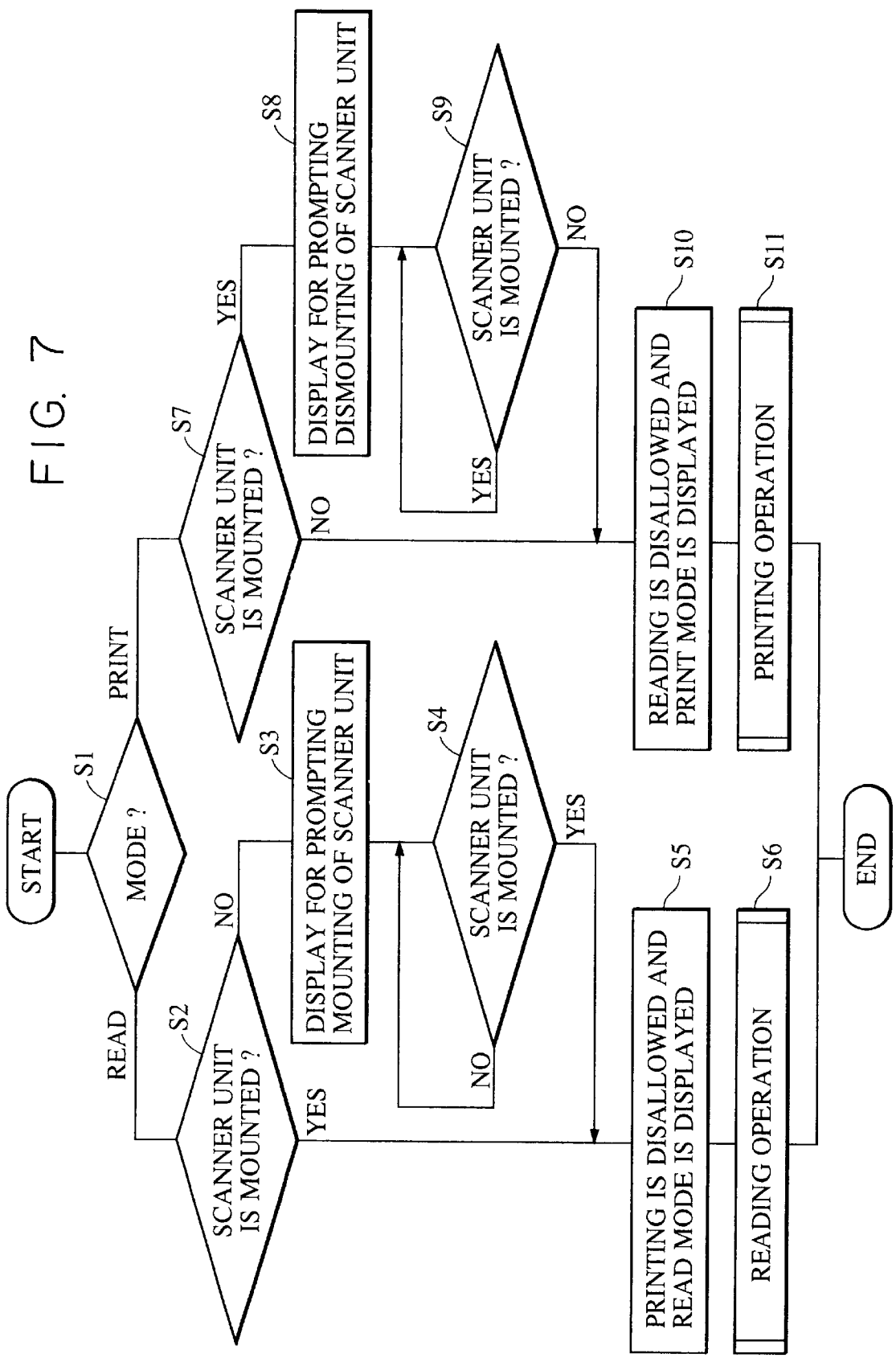

IMAGE PROCESSING APPARATUS AND SYSTEM HAVING A DETACHABLE SCANNER UNIT

BACKGROUND OF THE INVENTION

1. Field of the Invention

The present invention relates to an image information processing apparatus for performing recording on the basis of information read by reading means, such as a scanner.

2. Description of the Related Art

A recording apparatus used for printers, copying machines, facsimiles, etc. is designed to record an image formed of dot patterns on a recording medium, such as recording paper or a plastic thin plate, on the basis of image information.

Image information to be recorded is image information processed by a host apparatus in a printer. This image data is transmitted to the printer side in the form of parallel signals or serial signals, and an image formed of dot patterns is recorded on the basis of the image data.

In a copying machine, in contrast, an original document is read optically by reading means which is provided integrally therein. Image information thus obtained is formed into a latent image on a drum by means of analog or digital optical means, and this image is transferred to paper and recorded. Also, in a facsimile, signals which are read in by an image scanner which is provided integrally therein in a similar manner are transferred to another facsimile over a telephone line, and this image data is reprocessed and recorded.

As described above, a printer in the prior art, unlike an information output apparatus, such as a copying machine or a facsimile, performs recording on the basis of image data processed by a host apparatus. The image data processed by the host apparatus is input by reading the image data by a scanner or the like.

That is, in the prior art, three apparatuses of a host apparatus, a printer, and a scanner are provided individually, and this arrangement, for the first time, makes it possible to output an image by a printer.

However, since each apparatus is provided individually, it is difficult to use these apparatuses as a single unit in which these apparatuses are integrated, and also it is inconvenient for transportation. In a case where each apparatus is not used in an integrated manner, power consumption is increased.

With respect to such problems, an image reading and recording apparatus has been proposed in Japanese Patent Laid-Open publication No. 62-178058, such that a reading scanner is provided in the carriage in which an ink jet recording head is mounted in what is commonly called a serial type printer using the ink jet recording head, and an original document is read as the carriage is moved. Although such an arrangement eliminates the above-described problem that apparatuses are provided individually, it is found that new problems described below may arise due to the fact that the reading scanner shares the ink jet recording head and the carriage.

That is, since the reading scanner is provided closely to the ink jet recording head, there is the risk that ink mist caused as ink is discharged from the ink jet recording head may be deposited on the reading scanner and the electrical system thereof, deteriorating the reading performance.

SUMMARY OF THE INVENTION

The present invention has been achieved in view of the above-described problems. It is an object of the present invention to provide an image information processing apparatus and an image information processing system, which are easy to use with a reading apparatus (scanner) and a recording apparatus as an integrated system, which has excellent ease of transportation, and which makes possible the above-described system having a relatively small power consumption.

It is another object of the present invention to provide an image information processing apparatus and an image information processing system which are capable of eliminating a problem, such as the sensor becoming dirty which may occur when a reading apparatus (scanner) and a recording apparatus are used in an integrated manner.

It is still another object of the present invention to provide an image information processing apparatus for recording on a recording medium by using recording means, the image information processing apparatus comprising: mounting means for detachably mounting a reading unit for reading an original document; and transport means for transporting a recording medium and an original document in the same transport passage in a state in which the reading unit is mounted by the mounting means, and an image information processing system.

It is a further object of the present invention to provide an image information processing system capable of obtaining a driving force used in reading means from a mounted image information processing apparatus.

It is a still further object of the present invention to provide an image information processing system capable of obtaining power for reading means and a synchronization signal from a mounted image information processing apparatus.

It is a still further object of the present invention to provide an image information processing apparatus and an image information processing system, comprising: a printer for performing recording by using an ink jet head from which ink is discharged, a scanner unit for reading an original document, mounting means for detachably mounting the scanner unit in the printer, and transport means for transporting a recording medium and an original document in the same transport passage in a state in which the scanner unit is mounted by the mounting means.

It is a still further object of the present invention to provide an image information processing apparatus and an image information processing system, comprising: a printer for performing recording by using an ink jet head from which ink is discharged, a scanner unit for reading an original document, mounting means for detachably mounting the scanner unit in the printer, determination means for determining whether the scanner unit has been mounted in the printer by means of the mounting means, and control means for controlling the operation of the printer and/or the scanner unit according to the determination by the determination means.

It is a still further object of the present invention to provide an image information processing apparatus and an image information processing system, comprising: a printer for recording by using an ink jet recording head from which ink is discharged; a scanner unit for reading an original document; mounting means for detachably mounting the scanner unit in the printer; determination means for determining whether the scanner unit has been mounted in the printer by means of the mounting means; mode setting means capable of setting a print mode in which recording is performed by the printer, and a read mode in which reading is performed by using the scanner unit; print mode control means for controlling the print mode set by the mode setting means and for changing the mode of the control according to the determination by the determination means; and read mode control means for controlling the read mode set by the mode setting means and for changing the mode of the control according to the determination by the determination means.

It is a still further object of the present invention to provide an image information processing apparatus, and an image information processing system capable of using an image information processing apparatus and reading means, such as a scanner, in a state in which they are integrated, and transporting an original document and recording paper by the same operation.

It is a still further object of the present invention to provide an image information processing apparatus and an image information processing system, in which, since the control mode of the printer and the scanner unit can be changed according to the determination of whether the scanner unit has been mounted in the printer, printing is performed with a scanner unit being mounted, and recording paper can be prevented from being transported inside the scanner unit.

The above and further objects, aspects and novel features of the invention will be more fully apparent from the following detailed description when read in connection with the accompanying drawings. It is to be expressly understood, however, that the drawings are for the purpose of illustration only and are not intended to limit the invention.

BRIEF DESCRIPTION OF THE DRAWINGS

FIG. 7 is a flowchart illustrating the operation procedure of each mode of the embodiment shown in FIG. 6.

DETAILED DESCRIPTION OF THE PREFERRED EMBODIMENTS

Preferred embodiments of the present invention will be described below in detail with reference to the accompanying drawings.

[First Embodiment]

Figure 1:
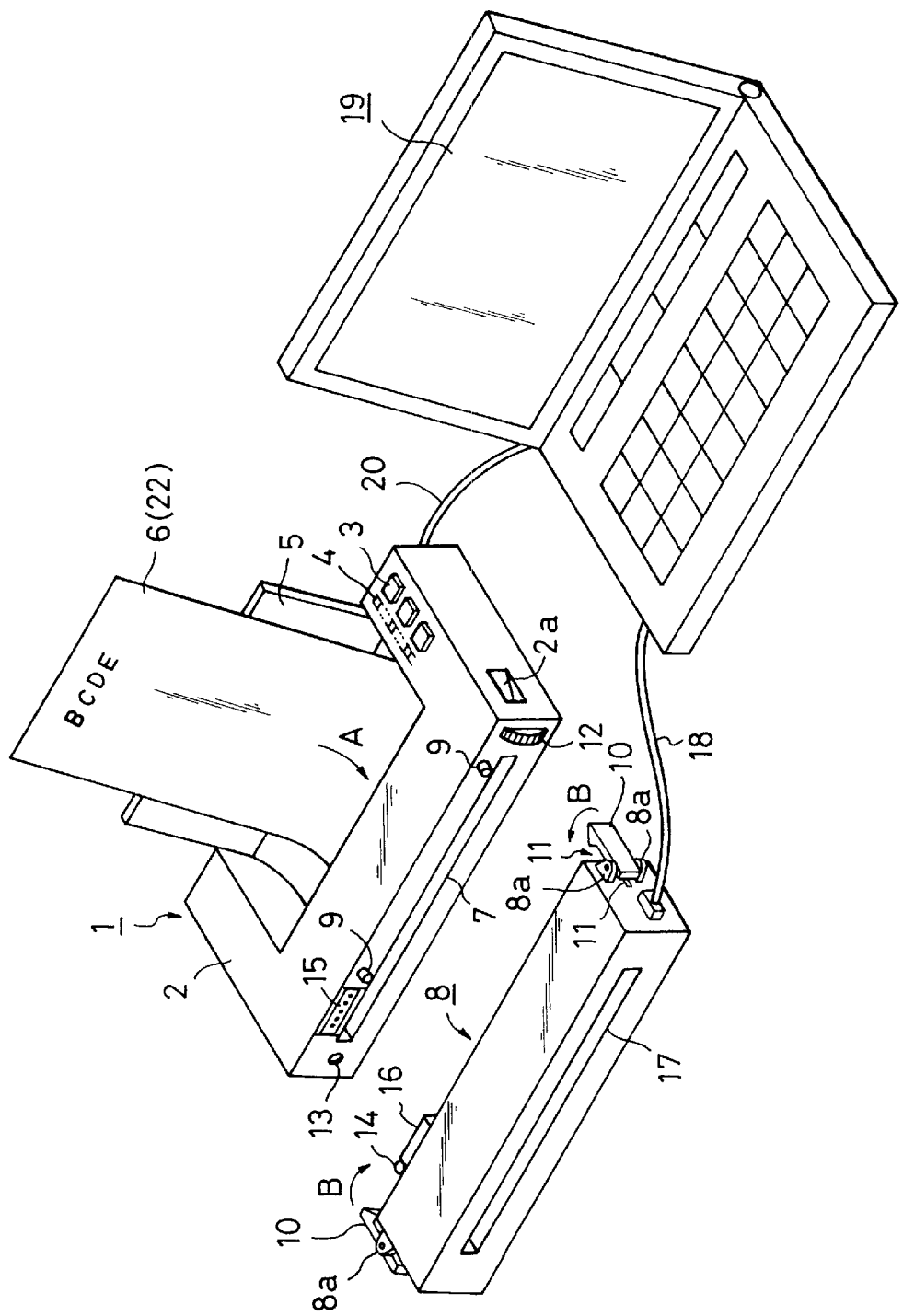
FIG. 1 is a schematic perspective view illustrating a recording apparatus provided with a scanner in a state in which these are separated from each other in accordance with one embodiment of the present invention.

FIG. 1 is a schematic perspective view illustrating a printer serving as an image information processing apparatus in accordance with one embodiment of the present invention, and a scanner serving as reading means mounted therein in a state in which these are separated from each other.

A printer 1 comprises operation buttons 3 and status display sections 4 on a part of the top surface of an outer casing 2 of the printer 1. A paper supporter 5 is disposed in the back portion of the outer casing 2 in such a manner as to freely turn by a hinge. The paper supporter 5 is opened as shown in the figure when the printer 1 is used, and closed when it is not in use so as for the paper supporter 5 to be flush with the top surface of the outer casing 2. When an original document 6 is inserted into the printer 1 along the paper supporter 5, the original document 6 is transported by a transport mechanism (not shown) along the direction of the arrow A in the figure, and no recording is performed during that time, and the original document 6 reaches a paper ejection port 7 disposed on the front side of the outer casing 2.

A scanner 8 has disposed therein a line type reading sensor, and reads an original document or the like, and is used together with the printer 1 via a personal computer 19 serving as a host apparatus. Positioning projections 9 are disposed at two places on the front side of the outer casing 2 of the printer 1, and as a result of the engagement of these projections 9 with positioning holes (not shown) of the scanner 8, positioning when the scanner 8 is mounted in the printer 1 is determined. At the time of this mounting, the tip of a hook 10 disposed on each of the sides of the scanner 8 engages a recess 2a disposed in correspondence with the hook 10 on the side of the outer casing 2 of the printer 1, causing the mounted printer 1 and scanner 8 to be fixed. In this construction, hook springs 11 are disposed inward of a pair of support plates 8a by which the hook 10 is pivoted rotatably. Because of this provision, a force for making the hook springs 11 turn in the direction of the arrow B in the figure acts upon the hooks 10, and the above-mentioned fixing is made possible.

A gear 12 for transmitting a driving force for transporting an original document in the scanner 8 is exposed in one of the end portions on the front side of the outer casing 2 of the printer 1. In correspondence with this, a gear which engages this transmission gear 12 is disposed on the scanner 8 side. As a result, all the motive power of the scanner 8 can be obtained from the printer 1 as will be described later. Also, on the front side of the outer casing 2 of the printer 1, a power jack receptacle 13 is disposed in the end portion on a side opposite to the portion where the gear 12 is exposed, and in correspondence with the power jack receptacle 13, a jack 14 is disposed on the scanner 8 side. When the printer 1 and the scanner 8 are combined into one unit, the power jack receptacle 13 is connected to the jack 14, thereby supplying power from the printer 1 to the scanner 8. Also, a connector 15 for connecting a synchronization signal is disposed on the printer 1 side, and in correspondence with this, a connector 16 is disposed on the scanner 8 side. When the printer 1 and the scanner 8 are combined into one unit, similarly, these connectors are connected to each other.

Figure 2:
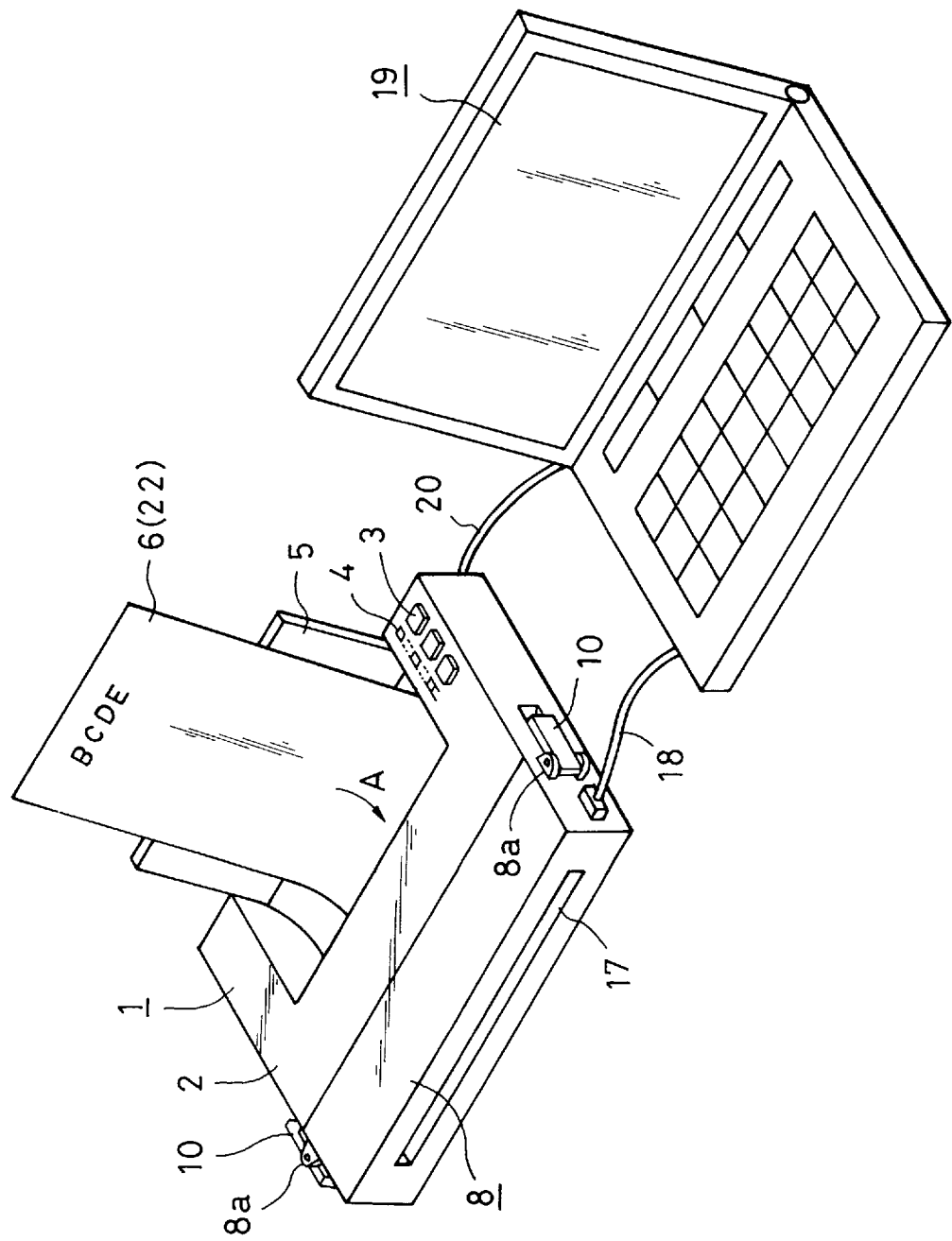
FIG. 2 is a schematic perspective view illustrating the scanner of FIG. 1 and the recording apparatus during use.

The printer 1 and the scanner 8 are used in a state in which these are combined into one unit as shown in FIG. 2. The original document 6 ejected from the paper ejection port 7 of the printer 1 is transported into the scanner 8 from a paper ejection port of the scanner 8 whereby an image on that original document is read by a line sensor (not shown), after which the original document 6 is transported to a paper ejection port 17 of the scanner 8 and ejected.

Figure 3:
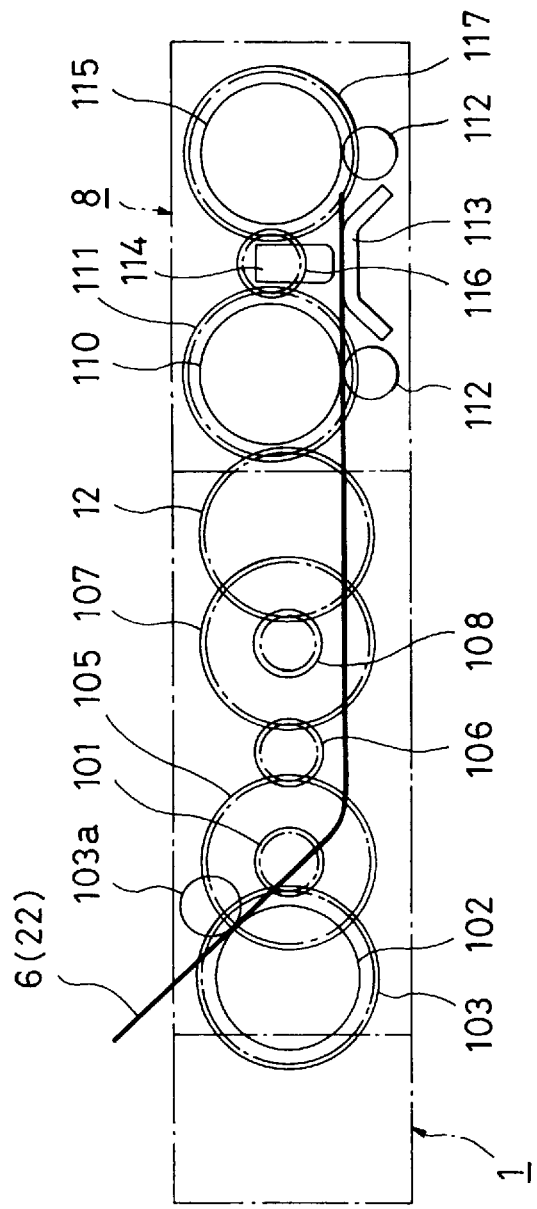
FIG. 3 is a schematic side view illustrating the construction of driving force transmission for transportation from the printer shown in FIGS. 1 and 2 to the scanner unit.

FIG. 3 is a side view illustrating the transmission of a driving force when the printer 1 and the scanner 8 are combined into one unit as shown in FIG. 2.

In FIG. 3, a motor gear 101 is mounted in a rotary shaft of a transportation motor (not shown), and engages a paper transport roller gear 103 mounted coaxially to a paper transport roller 102 of the printer 1. Thus, recording paper 22 and the original document 6 can be transported in the printer 1. Reference numeral 103*a* denotes an auxiliary roller which presses the original document 6 or the recording paper 22 against the paper transport roller 102, thereby generating the above-mentioned transportation force.

In addition to the motor gear 101, a gear 105 is mounted on the rotary shaft of the above-mentioned transportation motor, and the gear 105 is engaged with an idle gear 106. The idle gear 106 is also engaged with a gear 107, and a gear 108 placed coaxially to the gear 107 is engaged with the idle gear 12. The idle gear 12 is a final stage gear on the printer 1 side and is exposed outside of the printer 1, as shown in FIG. 1.

The idle gear 12 on the printer 1 side engages a paper transport roller gear 111 mounted coaxially to a paper transport roller 110 of the scanner 8. As a result, the paper transport roller 110 which obtains a driving force for the printer 1 side and is rotated is able to retract the original document 6 or the recording paper 22 sent from the printer 1 onto the scanner 8 side. A pinch roller 112 is disposed so as to press the original document 6 or the like against the paper transport roller 110 during this paper transportation, and the original document 6 or the like is transported toward a paper guide 113 by a transportation force generated by the pinch roller 112.

The image of the original document 6 transported on the paper guide 113 is read by a reading scanner 114 disposed at a position facing the paper guide 113 with the original document 6 being sandwiched between the paper guide 113 and the reading scanner 114. The original document thus read is transported by the cooperative operation of a paper transport roller 115 which rotates by a driving force transmitted from the paper transport roller gear 111 through an idle gear 116, and the pinch roller 112 which is in press contact with the paper transport roller 115, and the original document is ejected.

The case in which the recording paper 22 is transported is the same as that described above, and is different only in that reading of an image is not performed.

The data read by the scanner 8 in the above-described way is transferred to a host computer 19 through a cable 18 connected to the scanner 8. The data read in the above-described steps is transferred to the printer 1 side through an interface cable 20 by which the host computer 19 is connected to the printer 1. Thereafter, when the recording paper 22 is set in the printer 1 in the same manner as for the original document 6, an image based on the above-mentioned data is recorded on the recording paper 22.

The above description is concerned with a case in which the image on the original document 6 is the same as that to be recorded on the recording paper 22, i.e., a case of copy. When the data read by the scanner 8 is processed in various ways in the host computer 19 and the results thereof are recorded, also, the same steps as above are taken.

As described above, use of the printer and the scanner as one unit makes it possible to read the original document and record the image in the same operation, and transportation is easy. In addition, since the motive power to the scanner can be obtained from the printer side, less power consumption is required.

As the printer 1 which has been described, any of an ink jet method, a thermal method, a thermal transfer method, or a wire dot method may be used. Of the above methods, since the ink jet method is able to record a high-resolution image on plain paper or the like, and has the feature that miniaturization is easy and the feature of low power consumption, it is preferred as a printer of this embodiment.

[Second Embodiment]

Figure 4:
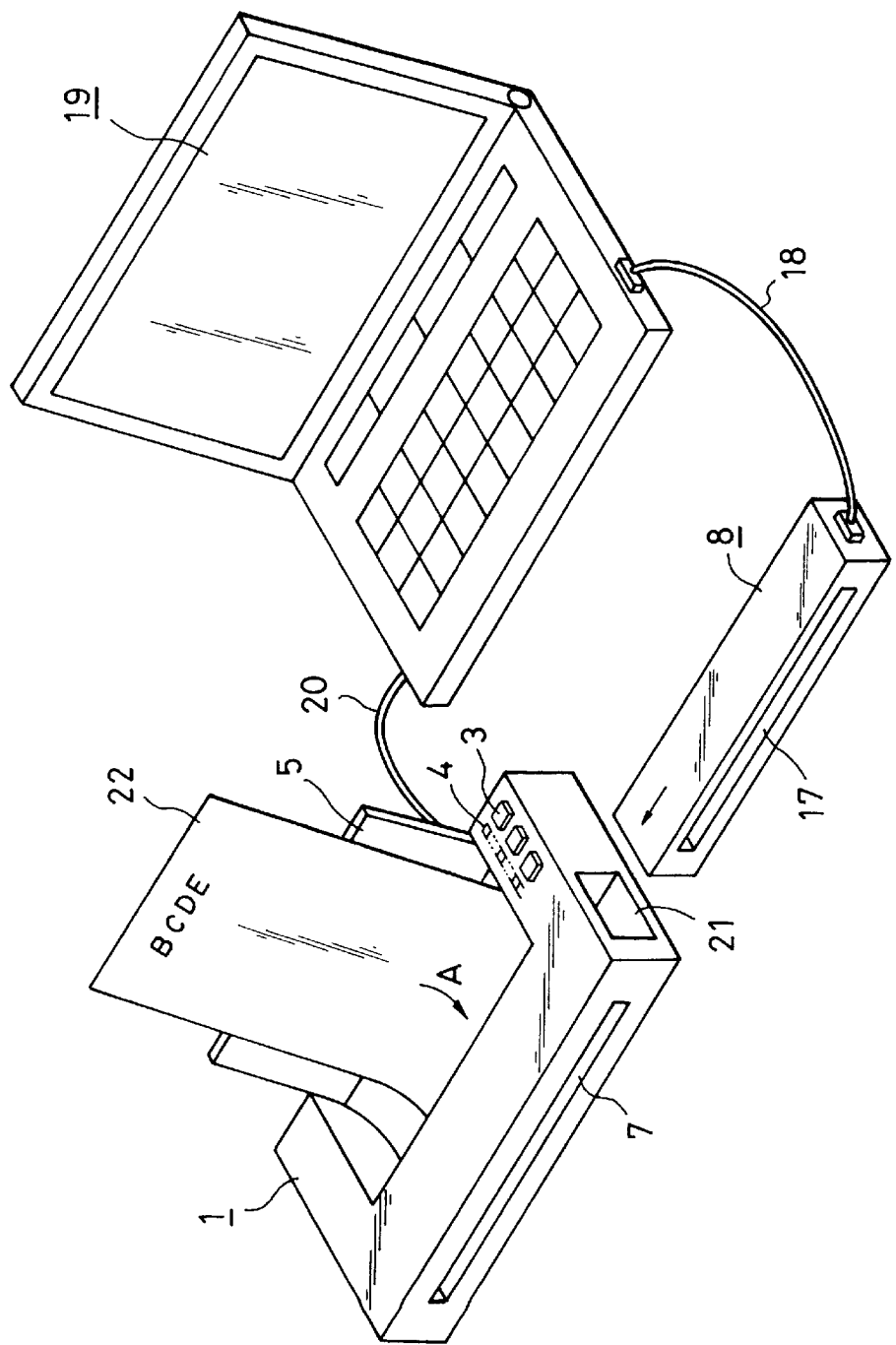
FIG. 4 is a schematic side view illustrating a recording apparatus provided with a scanner in a state in which these are separated from each other in accordance with another embodiment of the present invention.

FIG. 4 is a perspective view illustrating a printer and a scanner in accordance with a second embodiment of the present invention.

In this embodiment, the scanner is mounted by inserting the scanner 8 from an opening section 21 provided on the side of the printer 1 into the printer 1 as shown in FIG. 4 rather than being mounted outside the printer. As a result, in the same way as in the first embodiment, power supply sections for the printer 1 and the scanner 8 are connected, connectors for a synchronization signal are connected, and driving gears are engaged.

Of course, the respective paper supply and ejection ports for transporting the original document 6 or the recording paper 22 also coincide with each other when the scanner 8 is mounted, and as a result, the original document 6 or the like can be transported smoothly.

Figure 5A:
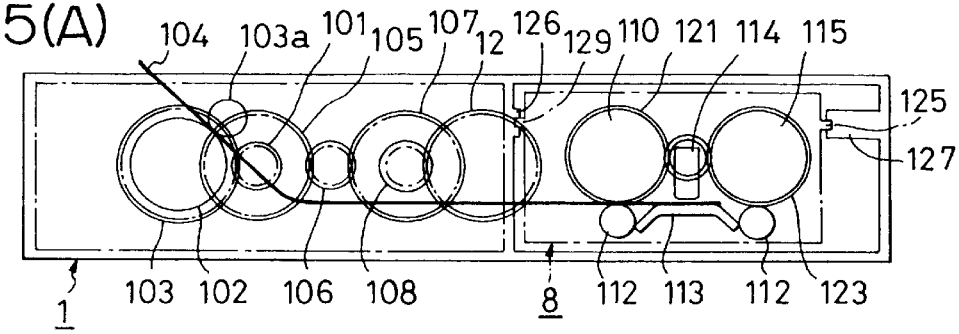
FIGS. 5(A) and 5(B) are respectively a schematic side view and a schematic top view illustrating the construction of driving force transmission for transportation from the printer shown in FIG. 4 to the scanner unit.
Figure 5B:
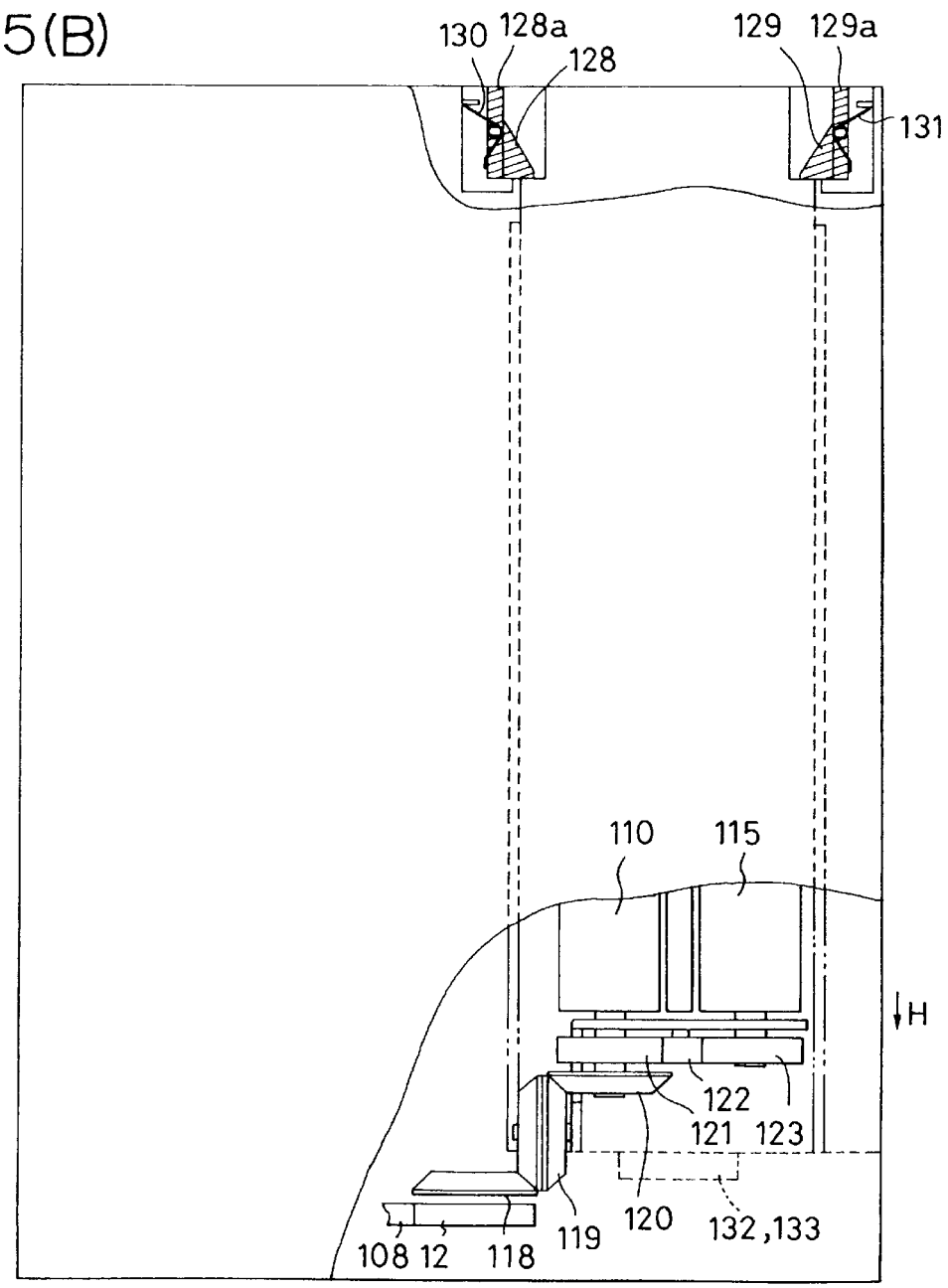

FIGS. 5(A) and 5(B) are respectively a side view and a top view illustrating a state in which the scanner unit 8 is inserted into the printer 1 and combined into one unit. Differences from the above-described first embodiment will now be described with reference to FIGS. 5(A) and 5(B).

A transmission gear 118, which is a bevel gear, is mounted coaxially to the final stage gear 12 on the printer 1 side. The transmission gear 110 on the printer 1 side is engaged with a transmitted gear 119 of the scanner unit 8 when the scanner 8 is mounted. The transmitted gear 119 is formed into a double bevel gear; one bevel of the double bevel gear engages the transmission gear 118 as described above, and the other engages a paper transport roller bevel gear 120 mounted coaxially to the paper transport roller 110. Further, a paper transport roller bevel gear 121 is mounted coaxially to the gear 120, and the driving force that the gear 121 transmits is transmitted to a paper ejection roller gear 123 mounted coaxially to the paper ejection roller 115 via the gear 122.

The scanner 8 is inserted in the direction of the arrow H in the figure. This insertion is guided as a result of the engagement of guide members 124 and 125 on the scanner 8 side with guide members 126 and 127 on the printer 1 side. The scanner 8 is inserted in such a manner as to open lock levers 128 and 129 disposed near the insertion port of the printer 1 in opposition to the press force by springs 130 and 131. When this insertion is completed, the lock levers 128 and 129 engage the step portions of the scanner 8 by the urging force of the springs 130 and 131. As a result, the scanner 8 is fixed to the printer 1. When this insertion is completed, the connector of the printer 1 is connected to the connector of the scanner 8, thus making it possible to supply power and a synchronization signal from the printer 1 to the scanner 8. When the scanner 8 is to be removed from the printer 1, the engagement of the lock levers 128 and 129 with the step portions of the scanner 8 is released by pinching the tips 128*a* and 129*a* of the lock levers 128 and 129.

In the first and second embodiments, the outline of the construction for transmitting the driving force for transporting from the printer 1 side to the scanner 8 side has been described. Regarding the timing at which an original document or the like is transported, the respective paper transport rollers of the printer 1 and the scanner 8 are simultaneously driven at a speed respectively determined by the gear ratio by means of the driving force of the motor of the printer 1. The recording paper or the original document is transported at the timing and speed respectively determined by the above driving, and recording or reading timing, or speed can be set in accordance with the transportation thereof. However, in contrast to the above, more preferably, the timing of the transportation in the printer 1 and the scanner 8 is set in accordance with the recording or reading timing of the printer 1 and the scanner 8 independently of each other. Such a construction is disclosed in, for example, Japanese Patent Laid-Open Publication No. 6-30915. In such a construction disclosed in the publication, similarly to the above-described first and second embodiments, the driving force of a recording roll, which is a paper transport roller of the printer unit, is used to intermittently transport the recording paper in the paper transport unit detachably mounted in the printer unit.

Although in the above-described first and second embodiments the scanner 8 receives power from the printer 1, it is clear that the same advantage can be obtained if a power supply, such as a battery, is contained in the scanner 8.

Although in this embodiment the scanner and the printer are connected to a host computer, an image read by the scanner is processed to record by the printer on the basis of this processing, the functions of the host computer may be contained in the printer unit, and the data read by the scanner may be directly transmitted to the printer side and processed thereby.

[Third Embodiment]

Although in the above-described first and second embodiments a line sensor is used in the scanner unit 8, a serial type reading sensor may be used instead of the line sensor. That is, a carriage on which a reading sensor is mounted is disposed in the scanner unit 8, and, this carriage is driven by the driving force transmitted from the printer 1 side in order to perform a reading operation in the same manner as that described above.

For transmitting the driving force in this case, for example, a lead screw is used which also serves as a guide member for guiding the movement of the carriage on which a reading sensor is mounted, and the driving force for rotating this screw may be obtained from, for example, the paper transport roller gear 111 shown in FIG. 3. In this construction, a known clutch mechanism or a parallel groove disposed in the lead screw is preferably disposed so that the timing between the transportation of the original document and the movement of the carriage on which the sensor is mounted in the scanner unit 8 are provided.

[Fourth Embodiment]

In this embodiment, there are a print mode and a read mode as the operating mode of the printer 1, and in the print mode, the scanner 8 is removed and printing is performed. That is, as described above, to eliminate the problem of providing a reading sensor on the carriage having a recording head mounted thereon, a scanner unit is disposed separately from the printer, and this scanner unit can be mounted and dismounted from the printer in the above-described first to third embodiments. In this embodiment, however, to further limit the deterioration of the performance of the reading sensor, only an original document is transported inside the scanner unit, and the incidence of the transportation thereof is reduced. As a result, it is possible to decrease the possibility that paper dust or the like caused by transportation may be deposited on the reading sensor.

Figure 6:
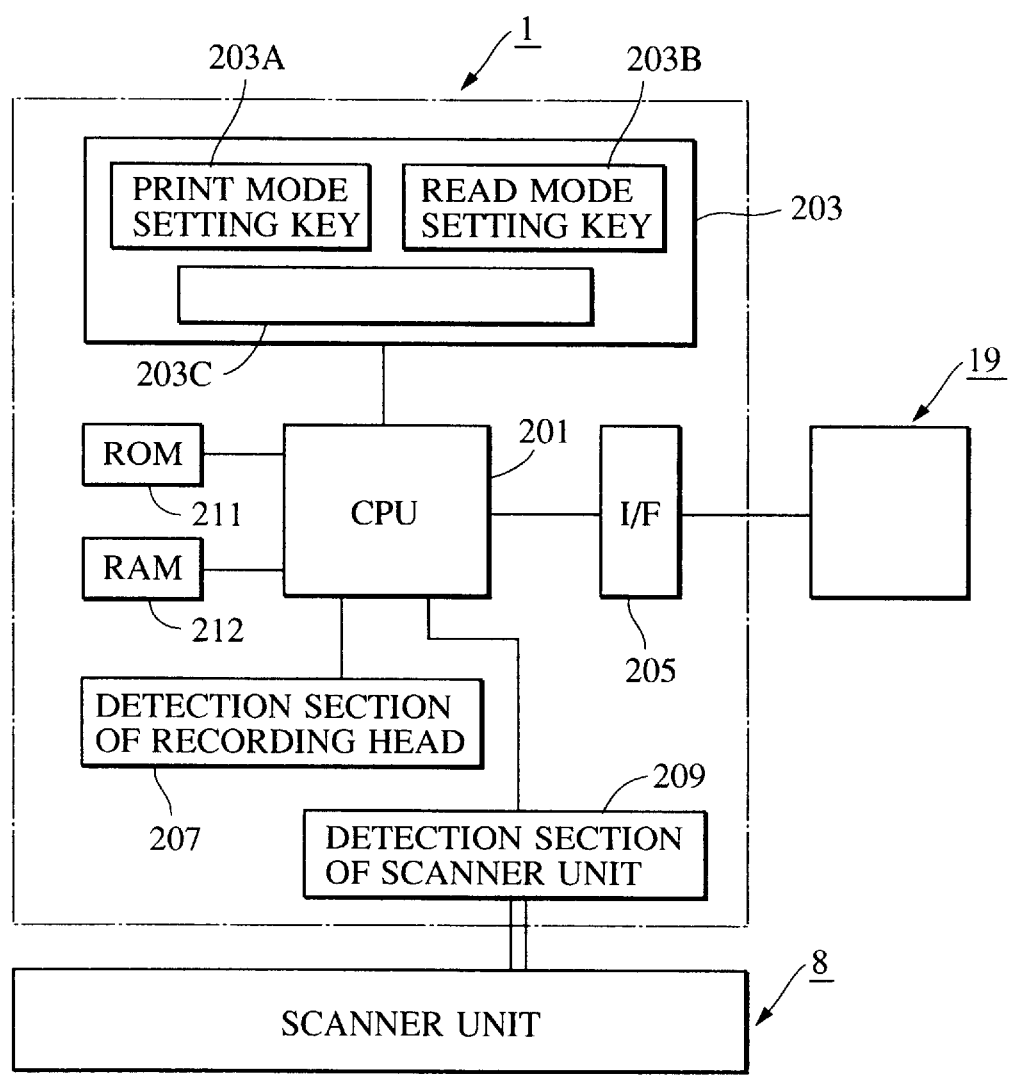
FIG. 6 is a block diagram illustrating the control arrangement of a printer or the like in accordance with still another embodiment of the present invention.

FIG. 6 is a block diagram illustrating the control configuration of this embodiment. FIG. 7 is a flowchart illustrating the operation procedure in the two modes of this embodiment.

In FIG. 6, a CPU 201 performs data processing and controls operations in the printer 1 and the scanner 8 mounted in the printer 1 while the CPU 201 exchanges data with a host apparatus via an interface (I/F). A ROM 211 stores an operation procedure to be described later with reference to FIG. 7, and a RAM 212 is used as a work area for the processing by the CPU 201. The printer 1 of this embodiment is provided with an operation section 203 which can be operated by an operator. In the operation section 203, keys 203A and 203B for setting the print mode and the read mode, respectively, are provided, and a display section 203C for displaying the status and the like of the printer 1 is also provided. It is a matter of course that such an operation section may be disposed in the host apparatus.

A detection section 209 of the scanner unit detects the mounting of the scanner 8 in the printer 1, for example, detects the mounting in accordance with the change in the signal when the respective connectors of the printer 1 and the scanner unit 8 are connected to each other as described previously.

The operation procedure shown in FIG. 7 is initiated when the operator presses either the mode setting key 203A or 203B of the operation section 203. Initially, in step S1, a check is made to determine which mode the pressed key is for.

When the mode is determined to be a read mode, then a check is made in step S2 to determine whether the scanner unit 8 has been mounted in the printer 1. This determination can be made on the basis of the detected signal of the detection section 209 of the scanner unit as described above. At this point, when it is determined that the scanner unit has not been mounted, in step S3, a display for prompting the mounting of the scanner unit 8 is made on a display section 203C of the operation section 203. In step S4, waiting for the scanner unit 8 to be mounted is done. When it is determined that the scanner unit 8 has been mounted, the process proceeds to step S5 where an operation related to a printing disallowance operation, for example, the pressing of the print mode setting key 203A is nullified, or a signal for disallowing ink from being discharged from the recording head is generated, and also the display section 203C displays the fact that it is in the read mode.

Thereafter, in step S6, the reading operation described in each of the above-described embodiments is performed, and this operation procedure is completed.

When it is determined in step S2 that the scanner unit 8 has been mounted, step S5 and subsequent steps are performed.

When, on the other hand, it is determined in step S1 that the apparatus is in the print mode, in step S7, a check is made to determine whether the scanner unit 8 has been mounted. When it is determined that the scanner unit 8 has been mounted, in step S8, an operation for disallowing a printing operation is performed, and a display for prompting the removal of the scanner unit 8 is made on the display section 203C. As a result, it is possible to prevent that a printing operation is performed with the scanner unit being mounted, and to limit the deterioration of the performance of the reading sensor.

After the display operation, in the same way as in the read mode, when it is determined that the scanner unit has been removed (step S9), a reading operation is disallowed, and this fact is displayed (step S10), and printing is performed (step S11).

When, in particular, a serial type reading sensor described in the third embodiment is used for the scanner unit 8, instead of performing an operation for removing the scanner unit in steps S8 and S9 shown in FIG. 7, an operation may be performed for retracting the carriage on which the reading sensor is mounted outside the transportation area of an original document, for example, to a home position.

[Other Embodiments]

In each of the above-described embodiments, the scanner unit is mounted on a downstream side in the original document and recording paper transportation system. However, in contrast to this, the scanner unit may be mounted on an upstream side of the transportation system. That is, the original document or the like is first transported inside the scanner unit, after which the original document is transported inside the printer.

With such a construction, when, in particular, a printer employing an ink jet method is used, since recording paper, on which ink has not been completely fixed immediately after recording, is not transported inside the scanner unit, there is no risk that the reading sensor may be made dirty by the ink.

In the third embodiment a mode determination is made prior to recording, and an operation corresponding to that determination is performed when there are the print mode and the read mode. However, in a case where, for example, the print mode has been set, when the operator mounts a scanner unit by mistake, the printing operation may be immediately stopped in response to the detection of the mounting, and a display for informing that the print mode has been set and for prompting that the scanner unit be dismounted may be made.

In addition, when the scanner unit 8 is used to read an original document, a blank space (printable area) of the read image, in which characters or the like can be written, may be detected, and this blank space, together with the read image, may be displayed on a specific area of the display section of the host apparatus 19. As a result, the operator is able to clearly recognize the area which does not overlap the read image and in which characters or the like can be input.

[Others]

The present invention comprises means for generating thermal energy as energy used for discharging ink (e.g., electro-thermal conversion member, laser light, etc.) from among, in particular, ink jet recording methods, and brings excellent advantages in a recording head or a recording apparatus employing a method in which the state of the ink is changed by the thermal energy. According to such a method, it is possible to achieve higher-density recording and higher-resolution recording.

For the representative construction and principle of the present invention, the basic principle may preferably be employed which is disclosed in, for example, U.S. Pat. Nos. 4,723,129 and 4,740,796. This method may be applicable to any of what is commonly called an on-demand type and a continuous type. In particular, in the case of the on-demand type, by applying at least one drive signal, corresponding to recording information, for causing a rapid temperature increase beyond nucleate boiling, to a sheet in which liquid (ink) is held and an electro-thermal conversion member disposed in correspondence with liquid passage, thermal energy is generated in the electro-thermal conversion member, and film boiling is caused to occur on the heat acting surface of the recording head. The method is effective because an air bubble in one-to-one correspondence with the drive signal can be formed eventually inside the liquid (ink). By discharging the liquid (ink) from a discharge opening on the basis of the growth and contraction of this air bubble, at least one droplet is formed. If the drive signal is in a pulse form, since the air bubbles are grown and contracted instantly, it is possible to discharge the liquid (ink), in particular, at a fast response, which is more desirable. As this drive signal in the pulse form, a signal is suitable which is disclosed in U.S. Pat. Nos. 4,463,359 and 4,345,262. If the conditions described in U.S. Pat. No. 4,313,124 which is concerned with the temperature increase rate of the heat acting surface are used, still more excellent recording can be performed.

In addition to the combined construction of a discharge opening, a liquid passage, and an electro-thermal conversion member (a straight-line liquid passage, or a right-angle liquid passage), disclosed in each of the above-described specifications, the construction of the recording head employing the specifications of U.S. Pat. Nos. 4,558,333 and 4,459,600, in which a heat acting surface is disposed in a bent area, is included in the present invention. In addition, the advantage of the present invention is effective even if a construction based on Japanese Patent Laid-Open Publication No. 59-123670 is used which discloses a construction in which a slit which is common to a plurality of electro-thermal conversion members is used as a discharge section of the electro-thermal conversion members, or a construction based on Japanese Patent Laid-Open Publication No. 59-138461 is used which discloses a construction in which an opening for absorbing pressure waves of the thermal energy is used as a discharge section. That is, according to the present invention, any configuration of the recording head makes it possible to perform recording surely and efficiently.

Further, the present invention can be effectively applied to a full line type recording head having a length corresponding to the maximum width of a recording medium which can be recorded by the recording apparatus. Such a recording head may satisfy the length by a combination of a plurality of recording heads, or may be one recording head formed into one unit.

In addition, the present invention is effective in cases where the following is used from among the serial types of the above examples: a recording head fixed to the main unit of the apparatus, a replaceable chip type recording head such that the recording head is electrically connected to the main unit of the apparatus and ink can be supplied from the main unit of the apparatus when the recording head is connected to the main unit of the apparatus, or a cartridge type recording head in which an ink tank is integrally provided in the recording head itself.

In the recording apparatus of the present invention, the provision of discharge recovery means of the recording head, preliminary auxiliary means, etc. stabilizes the advantage of the present invention even more, which is desirable. Specific examples thereof are capping means for capping the recording head, cleaning means, pressurizing or suction means, preliminary heating means for heating by using an electro-thermal conversion member or a heating element different from this member or a combination of these, and preliminary discharge means for discharging different from that for recording.

Regarding the type and the number of recording heads to be mounted, only one recording head may be mounted in correspondence with, for example, ink of a single color, or a plurality of recording heads may be mounted in correspondence with a plurality of inks having different recording colors and densities. The present invention can be very effectively applied to an apparatus having, in addition to only the recording mode of only the mainstream color such as black, at least one recording mode of a plurality of different colors or a full color by mixed colors based on any of that the recording head is constructed as one unit or in a combination of a plurality of recording heads.

In addition, although in the above-described embodiments of the present invention ink is described as a liquid, ink which solidifies at room temperature or lower temperatures and softens or liquefies at room temperature may be used, or ink may be used such that it is liquefied when a use recording signal is provided because in the ink jet method, generally, the temperature of the ink itself is controlled in the range from 30° C. to 70° C. so that the viscosity of the ink is controlled to be in a stable discharge range. In addition, to positively prevent a temperature increase caused by thermal energy by using the temperature increase as energy for changing the state of the ink from the solid state to the liquid state, or to prevent the evaporation of the ink, ink which solidifies when it is allowed to stand and liquefies by heating may be used. In either case, the present invention can be applied to a case in which ink having the nature such that the ink liquefies for the first time when thermal energy is applied thereto, for example, ink which liquefies when thermal energy corresponding to a recording signal is provided and liquefied ink is discharged, or ink which has already begun to solidify when it reaches the recording medium. The ink in such a case may be formed in such a way that the ink is held as liquid or solid matter in a porous sheet recess or a through hole, and it faces the electro-thermal conversion member, as disclosed in Japanese Patent Laid-Open Publication Nos. 54-56847 and 60-71260. In the present invention, the above-described film boiling method is executed most effectively for each of the above-described inks.

As has been described up to this point, according to the embodiments of the present invention, it is possible to use an image information processing apparatus and reading means, such as a scanner, in a combined state, and to transport an original document and recording paper by the same operation.

It is also possible to obtain motive power, electric power or the like for the scanner, etc. from the image information processing apparatus.

In addition, since the control mode of the printer and the scanner unit can be changed according to the determination of whether the scanner unit has been mounted in the printer, it is possible to prevent that printing is performed with the scanner unit being mounted and the recording paper is transported within the scanner unit. As a result, it is possible to use as a system in which the image information processing apparatus and the scanner are combined, and handling thereof becomes easy. Also, since the scanner and the recording apparatus can be combined into one unit, it is possible to obtain a system having ease of transportation.

Further, it is possible to reduce the power consumption as the whole system. It is also possible to prevent the deterioration of the performance of a reading sensor of the scanner unit.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claimed. The scope of the following claims is to be accorded the broadest interpretation so as to encompass all such modifications and equivalent structures and functions.

What is claimed is:

1. An image information processing apparatus comprising:
   a recording unit for recording on a recording medium with recording means, said recording unit comprising first transport means for transporting the recording medium in a transport passage; and
   interconnecting means for detachably interconnecting in an interconnected state a reading unit for reading an original document, the reading unit comprising second transport means for transporting an original document in the transport passage in the interconnected state, wherein a driving force for driving the second transport means is obtained from said first transport means.

2. An image information processing apparatus according to claim 1, wherein power for said reading unit and a synchronization signal are supplied through said interconnecting means.

3. An image information processing apparatus according to claim 1, wherein signals read by said reading unit are transmitted to a host apparatus connected to the reading unit, and recording is performed by said recording unit of said image information processing apparatus on a basis of data processed by a host apparatus.

4. An image information processing apparatus according to claim 1, wherein said recording means comprises an electro-thermal conversion member, and uses thermal energy generated by the electro-thermal conversion member in order to discharge ink.

5. An image information processing system comprising:
   a printer for recording by using an ink jet recording head from which ink is discharged;
   a scanner unit for reading an original document;
   interconnecting means for detachably interconnecting said scanner unit with said printer;
   determination means for determining whether said scanner unit has been interconnected with said printer by means of said interconnecting means; and
   control means for controlling operation of said printer and/or said scanner unit according to the determination by said determination means, wherein said control means prevents operation of said printer when said determination means determines that said scanner unit has been interconnected with said printer.

6. An image information processing system comprising:
   a printer for recording by using an ink jet recording head from which ink is discharged;
   a scanner unit for reading an original document;
   interconnecting means for detachably interconnecting said scanner unit with said printer;
   determination means for determining whether said scanner unit has been interconnected with said printer by means of said interconnecting means;
   mode setting means for setting a print mode in which recording is performed by said printer, and a read mode in which reading is performed by said scanner unit;
   print mode control means for controlling the print mode set by said mode setting means and for changing the mode of the control according to the determination by said determination means; and
   read mode control means for controlling the read mode set by said mode setting means and for changing the mode of the control according to the determination by said determination means.

7. An image information processing system according to claim 6, wherein said print mode control means disallows the recording operation of said printer and indicates a request for prompting the dismounting of said scanner unit when said determination means has determined that said scanner unit has been interconnected.

8. An image information processing system according to claim 6, wherein said read mode control means disallows the recording operation of said printer when said determination means has determined that said scanner unit has been interconnected.

9. An image information processing system according to claim 6, wherein power for said scanner unit and a synchronization signal are supplied from said printer when said scanner unit has been interconnected with said printer by said interconnecting means.

10. An image information processing system according to claim 6, wherein signals read by said scanner unit are transmitted to a host apparatus connected to the scanner unit, and recording is performed by said printer on a basis of data processed by the host apparatus.

11. An image information processing system according to claim 6, wherein said ink jet head comprises an electro-thermal conversion member, and uses thermal energy generated by the electro-thermal conversion member in order to discharge ink.

* * * * *